US008414990B2

(12) United States Patent
Arnold et al.

(10) Patent No.: US 8,414,990 B2
(45) Date of Patent: Apr. 9, 2013

(54) IN PARTICULAR FRUSTOCONICAL HOLLOW BODY WHICH CAN BE STABILIZED BY POSITIVE AIR PRESSURE AND CAN BE ANCHORED ON AN UNDERLYING SURFACE VIA BRACING MEANS

(75) Inventors: Michael Arnold, Hall in Tirol (AT); Martin Jehart, Wenns (AT)

(73) Assignee: Red Bull GmbH, Fuschl am See (AT)

( * ) Notice: Subject to any disclaimer, the term of this patent is extended or adjusted under 35 U.S.C. 154(b) by 0 days.

(21) Appl. No.: 12/087,354

(22) PCT Filed: Jan. 5, 2006

(86) PCT No.: PCT/AT2006/000005

§ 371 (c)(1), (2), (4) Date: Nov. 21, 2008

(87) PCT Pub. No.: WO2007/076560

PCT Pub. Date: Jul. 12, 2007

(65) Prior Publication Data

US 2009/0169779 A1 Jul. 2, 2009

(51) Int. Cl.
*B29D 22/02* (2006.01)

(52) U.S. Cl.
USPC .......................... 428/36.1; 428/34.1; 428/35.7

(58) Field of Classification Search ................. 428/35.7, 428/34.1, 36.9, 35.2, 35.5, 36.1; 116/210, 116/209; 40/603, 212, 217; 244/31, 98; 206/810; 24/381, 382, 386
See application file for complete search history.

(56) References Cited

U.S. PATENT DOCUMENTS 3,707,320 A * 12/1972 Brynes ......................... 116/63 P
6,575,403 B1 * 6/2003 Monroe .......................... 244/31

FOREIGN PATENT DOCUMENTS

DE 94 07 294 U1 10/1994
WO WO 2004/106120 * 12/2004

OTHER PUBLICATIONS

Cox, B., A New Kind of Air Racing, Pilot Journal, Mar.-Apr. 2005, 49-53, 86.

* cited by examiner

*Primary Examiner* — Gwendolyn Blackwell
*Assistant Examiner* — Yan Lan
(74) *Attorney, Agent, or Firm* — Champman and Cutler LLP

(57) ABSTRACT

An in particular frustoconical hollow body (1) which can be stabilized by positive air pressure and which can be anchored to a base support (30) by way of bracing means is composed of a plurality of flexible material webs (4 to 12) which each extend in the peripheral direction of the hollow body (1). The mass in relation to surface area of the material webs (4 to 12) varies over the length of the hollow body (1).

21 Claims, 3 Drawing Sheets

IN PARTICULAR FRUSTOCONICAL HOLLOW BODY WHICH CAN BE STABILIZED BY POSITIVE AIR PRESSURE AND CAN BE ANCHORED ON AN UNDERLYING SURFACE VIA BRACING MEANS

The invention concerns an in particular frustoconical hollow body which can be stabilised by positive air pressure and which can be anchored to a base support by way of bracing means and which is composed of a plurality of flexible material webs which each extend in the peripheral direction of the hollow body.

BACKGROUND OF THE INVENTION

Hollow bodies which are held in a stable position by a continuous feed of air by means of a blower and in which there is admittedly a given positive pressure but which are not inflated as that air can escape again at least one location are frequently used for advertising purposes. By way of example DE 94 07 294 U discloses an advertising tube, which is 3 meters in diameter and 27 meters in height. An additional water container is provided in the region of the ground in order to achieve the necessary stability in relation to the ground while cables, which can be anchored to the ground for guying purposes extend to about three quarters of the height of the hollow body.

Recent times have seen the organisation of aerobatic flying competitions in which the aircraft must fly a course which is defined by overdimensional 'slalom gates'. The gates comprise two 'slalom poles' which are set up at a spacing of for example 10 to 14 meters and which are 18 meters in height. The gates have to be negotiated in accordance with given rules, which are not essential here.

The individual slalom poles are hollow bodies of the kind set forth in the opening part of this specification which are not cylindrical but conical, wherein the hollow body axis extends inclinedly so that the generatrices, which define the gate, of the two hollow bodies are in mutually parallel relationship. The hollow bodies are composed of a plurality of flexible material webs comprising a material, which tears immediately when it comes into contact with a part of the aircraft. That means that there is no resistance such as to endanger the aircraft and the damaged hollow body collapses into itself and is replaced by a new one.

Fixing to a support foundation is implemented by way of guying cables which can only be arranged up to a low height above the ground (about two to two and a half meters) so that the stability which is to be achieved exclusively by the positive air pressure hitherto entailed problems, in particular as the hollow bodies must withstand wind speeds of up to 50 kph. Guying cables, which are fitted further up would endanger the aircraft.

BRIEF SUMMARY OF THE INVENTION

Therefore the object of the present invention is to improve the stability and steadiness of such a hollow body. That is achieved in that the mass in relation to surface area of the material webs varies over the length of the hollow body.

By this means the hollow body wall is sufficiently strong in the lower region so that it can withstand the loadings from the upper region of the hollow body without guying cables, and tears so easily in the upper region that an aircraft coming into contact therewith does not encounter any resistance which is detrimental to its flight.

In that respect a continuous reduction in the mass in relation to surface area from the anchoring side to the free end is not necessary. Thus the strip of material from which the guying cables extend is preferably of a substantially higher mass in relation to surface area than for example the strip of material, which rests on the base support. Nonetheless it is preferably provided that the mass in relation to surface area of the material webs is greater in the region of the anchorable end of the hollow body than in the region of the free end.

The material webs are not only of different masses in relation to surface area but they are preferably also of different materials or materials which have been treated differently. By way of example heavier material webs can comprise a PD- or PVC-coated polyester fabric while lighter material webs are formed in particular in the endangered region towards the free end at least in part from a rip stop fabric. Rip stop fabrics usually have in spaced relationship stronger warp and weft threads in order to guide and restrict tears. For the lighter material webs however it is also advantageously possible to use rip stop fabrics which involve stronger warp threads which extend in the peripheral direction of the hollow body and only identical weft threads or stronger weft threads at great spacings so that a tear parallel to the warp threads is not necessarily braked.

The positive air pressure is maintained in the hollow body by at least one blower, in particular with an internal combustion engine, which is preferably disposed in a housing.

The air pressure in the interior of the hollow body is in that case desirably set at between 5 and 35 mbars, preferably 10 and 15 mbars. With respect to the real bursting pressure, that is to say that pressure at which the hollow body bursts, the positive pressure is desirably at least 10%, preferably at least 30% and still more preferably at least 50% of the real bursting pressure of the hollow body. That taut inflation provides that, in the event of an aircraft coming into contact with the hollow body, the latter bursts explosively as directly as possible or close to the location of impact and as a result no pieces of fabric remain hanging from the aircraft.

In regard to the theoretical bursting pressure (that mathematically ascertained value of the internal pressure in relation to the tearing force of the fabric in accordance with the respective technical data sheet), advantageous positive pressure values in the hollow body are between 3% and 50% of that theoretical bursting pressure of the hollow body material, preferably between 5% and 25% of the theoretical bursting pressure. It is to be noted that the tearing force of technical fabrics is weakened by production procedures and joins such as for example sewing so that the real bursting pressure is reached markedly earlier than the theoretical bursting pressure. The theoretical bursting pressure however can be more easily ascertained on the basis of technical data sheets.

For the major part the material webs are closed and joined together by zip fasteners to afford the in particular frustoconical hollow body portions, material webs near the anchoring can also be fixedly sewn.

For dismantling, in a preferred configuration, there is provided at least one desired separation location, which is disposed approximately at the middle of the hollow body. When the desired separation location is opened the free part quickly blows out and the remaining part quickly collapses into itself as the cross-sectional area at the desired separation location, particularly in the case of a frustoconical shape, is a good deal bigger than the cross-sectional area of all leaky openings which are necessary to maintain the stabilising positive pressure. A rapid reduction is necessary in particular in the case of a stronger wind as the hollow body, which is no longer stabilised would be caught by the wind in the manner of a sail, in which case damage could scarcely be avoided.

The desired separation location preferably also includes a zip fastener which preferably does not include a slider and which is opened at the two mutually overlapping ends. While all other zip fasteners are completely covered by a hook-and-loop closure strip, in the case of the zip fastener at the desired separation location only the opened ends are secured by a removable connection. The removable connection preferably includes a tongue which bridges over the ends and which is fixed by means of a hook-and-loop fastener to the two material webs and which is provided with a rip cord.

For dismantling therefore on the one hand the tongue is opened by pulling on the rip cord and the zip fastener is triggered to burst open while on the other hand the burst-away upper half is captured by holding fast the catch line which hangs down from the free end. Optionally, in particular when dealing with longer or higher hollow bodies, two such desired rupture locations may also be of advantage.

The peripherally extending warp threads of the material webs are preferably those, which stretch due to the positive air pressure by about 5% to 6%. By virtue of suitable diametral bracing means or the like it is possible, instead of a circular truncated cone, to achieve for example a truncated cone with an elliptical base surface, wherein the major ellipse axes of two hollow bodies which are brought together to form a 'gate' then lie in the line of the gate and the stability in the plane of the gate is further improved in order to avoid fluctuations in the spacing between the free end regions as far as possible.

Special shapes for the hollow bodies, specific configurations and handling and processing means for delivering items of information to the pilots or to the public, for example including advertising, are readily possible.

DETAILED DESCRIPTION OF THE INVENTION

Figure 2:
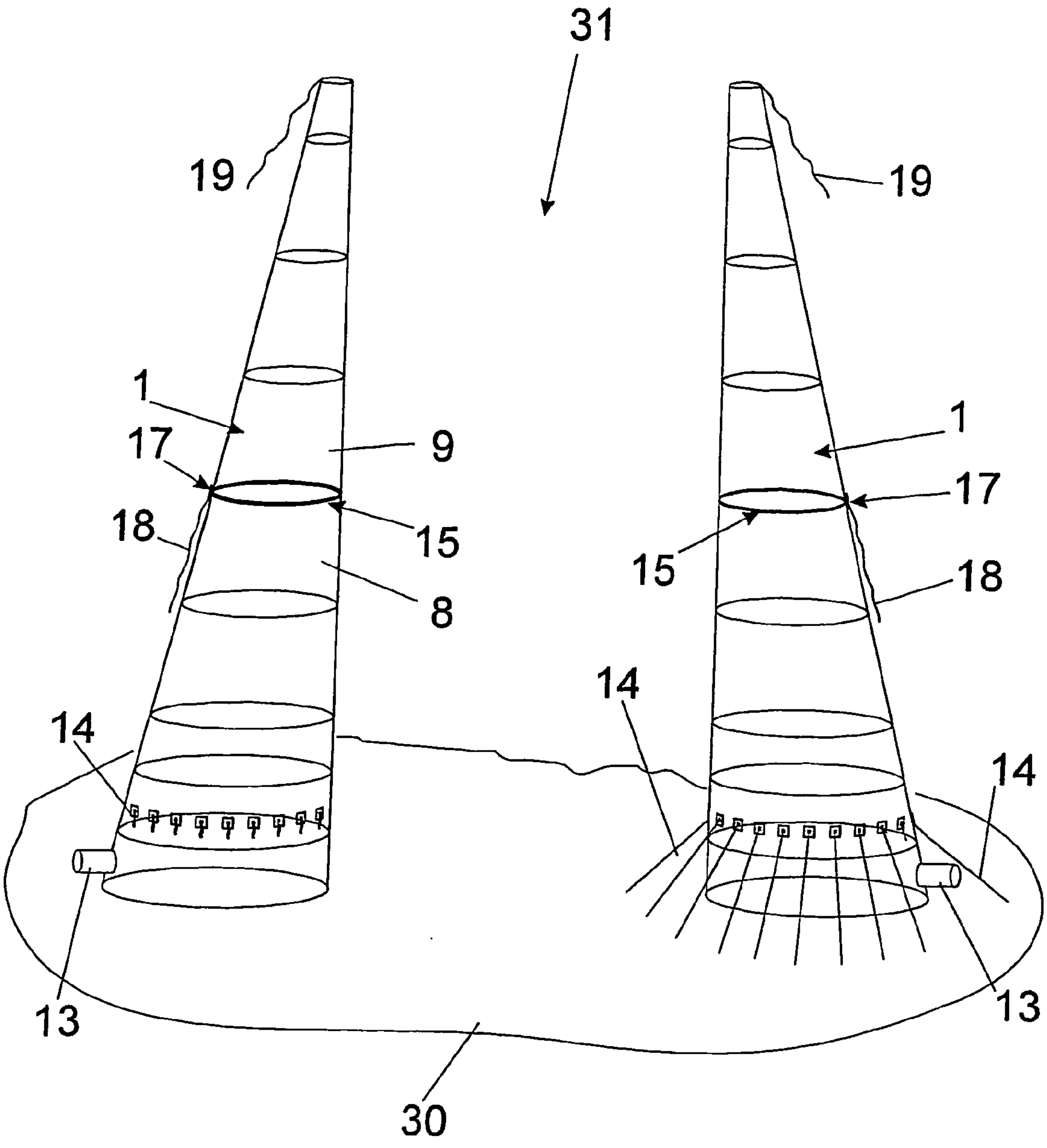
FIG. 2 shows a gate, which is made up from two hollow bodies.

Hollow bodies 1 according to the invention are preferably used in pairs as shown in FIG. 2 for setting up 'gates' 31 of an agility course for aircraft and therefore represent large-dimensioned 'slalom poles'. The hollow bodies 1 can be set up vertically and can be anchored to any desired support, not only on the ground but also on pontoons or the like floating in water. The hollow bodies 1 however can also be arranged hanging from high bridges or projecting horizontally from walls or the like, wherein particularly in the latter case they can also be used individually as there is no need for the 'gate' to be delimited downwardly. Anchorage to the base 30 is effected by means of bracing means in the form of guying cables 14 which are arranged at a height of about two to two and a half meters on the hollow body 1. By virtue of the guying cables 14 which can only be provided close to the base 30 the hollow body cannot be formed from one material web but is composed of a plurality of and in the specific embodiment nine material webs 4 to 12 which have different properties. The material webs comprise in particular fabrics whose warp threads extend in the peripheral direction, wherein at least material webs 4, 5 and 6 in the region of the anchorage are heavy fabrics, in particular coated polyester fabrics, while at least those material webs 10, 11 and 12 in the region of the free end are fabrics which are as light as possible and which, in the event of the aircraft coming into contact therewith, do not form any resistance such as to endanger it, in particular polyester rip stop fabrics.

A preferred embodiment is of the following structure, considered in an upward direction:

| Component | Material designation | Mass in relation to surface area in grams per square metre | Tearing strength of the warp threads in Newtons | Tearing strength of the weft threads in Newtons | Continued tearing strength of the warp threads in Newtons/5 cm | Continued tearing strength of the weft threads in Newtons/5 cm |
|---|---|---|---|---|---|---|
| Ground | Polyurethane-coated polyester fabric | 170 | 2500 | 1500-1600 | 350-400 | 250 |
| Material web 4 | Polyurethane-coated polyester fabric | 170 | 2500 | 1500-1600 | 350-400 | 250 |
| Material web 5 | Polyvinyl chloride-coated polyester fabric | 680 | 3000 | 2800 | 300 | 300 |
| Material web 6 | Polyurethane-coated polyester fabric | 170 | 2500 | 1500-1600 | 350-400 | 250 |
| Material web 7 | Polyvinyl chloride-coated polyester fabric | 350 | 1100 | 1000 | 60 | 30 |
| Material web 8 | Polyurethane-coated polyester fabric | 120 | 1300 | 800 | 40 | 50 |
| Material web 9 | Polyester rip stop fabric | 100 | 750-800 | 650-800 | 40-50 | 40-45 |
| Material webs 10, 11 and 12 | Polyester rip stop fabric | 60 | 480 | 860 | 30-90 | 30-80 |

Figure 1:
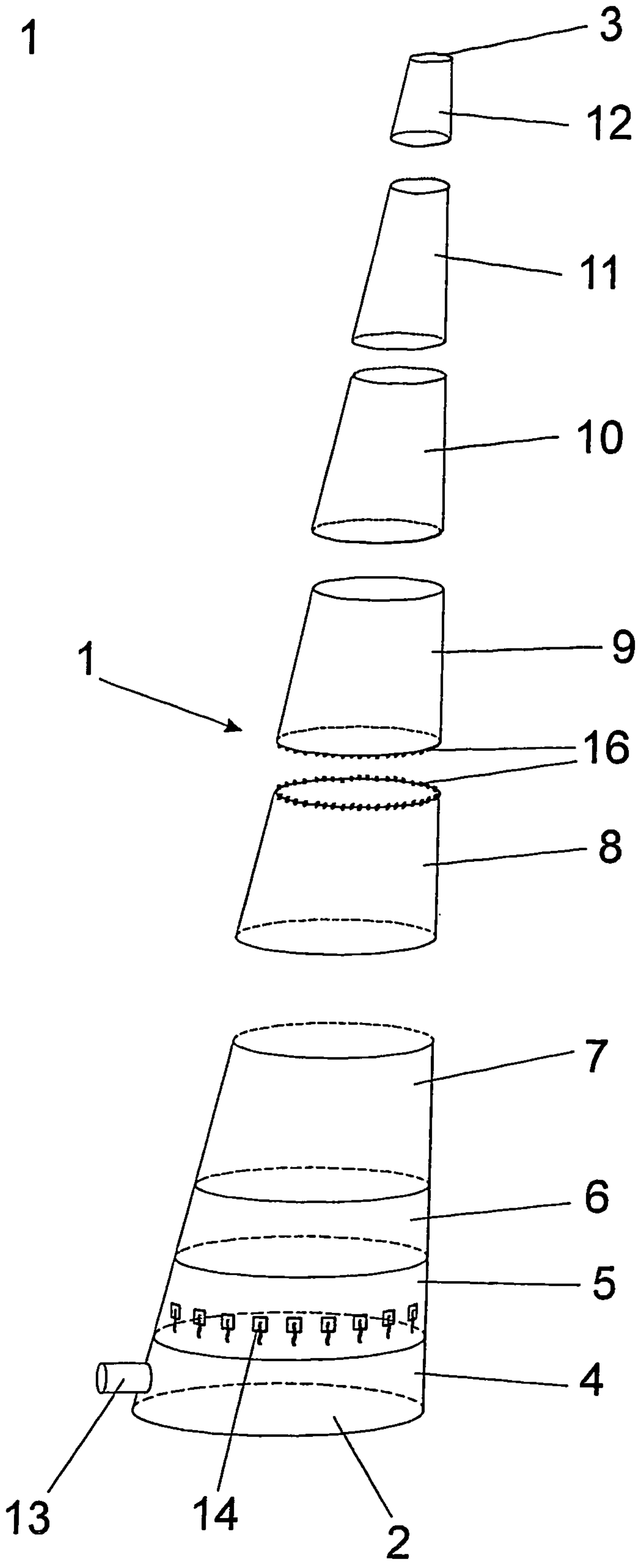
FIG. 1 shows a diagrammatic view of a hollow body, partly in exploded form.

As mentioned each hollow body 1 as shown in FIG. 1 or FIG. 2 is composed of the material webs 4 to 12, wherein they are cut in such a way as to afford an inclined truncated cone in which the shortest generatrix is perpendicular to the ground and the connecting seam of each web of material is provided in diametrically opposite relationship in the longest generatrix.

The ground and the three adjoining material webs 4, 5, 6 and possibly also 7 can be sewn together. An inlet or a window 13 is provided in the material web 4 for a blower, which ensures an ongoing positive air pressure in the hollow body. Additional anchoring tags for the guying cables 14 are provided at the material web 5, which is conspicuously heavier. The material web 4 can also have a further closable inlet so that it is possible for people to go into the interior, for example to provide lighting.

The hollow body 1 is of a preferred height of 18 meters corresponding to the rules applicable at the present time in relation to aerobatic competitions and the width of a 'gate' 31 as shown in FIG. 2 is between 8 and 14 meters. It will be appreciated that if a hollow body 1 is damaged during a competition, repair or installation of a fresh hollow body 1 as quickly as possible is a necessity. For that reason in particular the material webs 9, 10, 11 and 12 which are in danger of being damaged in the region of the free end are connected together by zip fasteners and hook-and-loop fasteners covering the zip fasteners, or other restorable connections, so that a material web can be quickly replaced.

After an event the hollow bodies must be taken down, in which case when the stabilising positive air pressure in the interior is no longer present, a phase occurs, which is without any problem only when there is no wind. When there is a wind the unstable hollow bodies are exposed thereto similarly to a sail and are blown away, torn out of the anchorage and/or damaged even more. In order to avoid that the hollow body 1 is provided with a desired separation location 15 (see FIG. 2) at which extremely rapid separation of the hollow body into two parts can be effected in specifically targeted fashion. The desired separation location 15 is preferably provided approximately at the middle.

Figure 3:
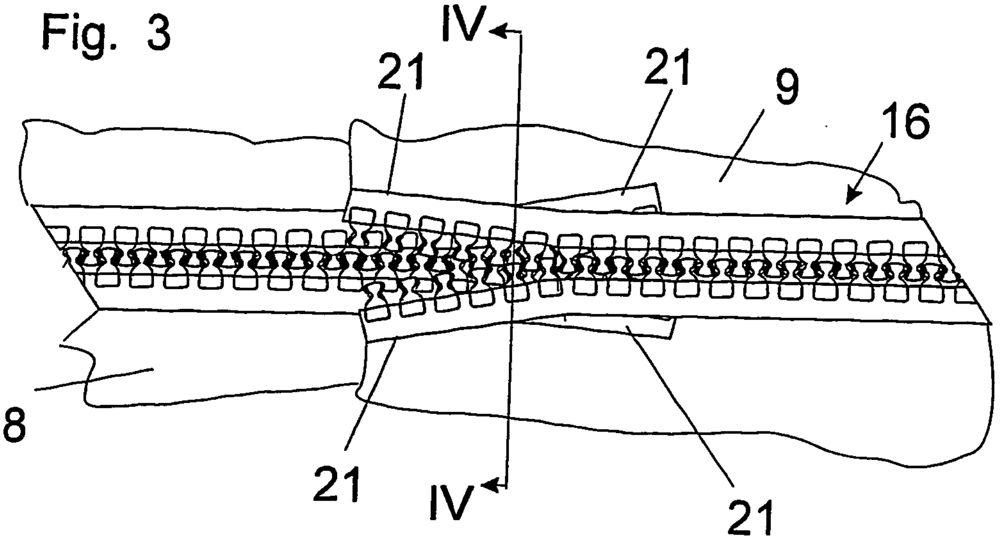
FIG. 3 shows the overlap region of the desired separation location without securing connection.
Figure 4:
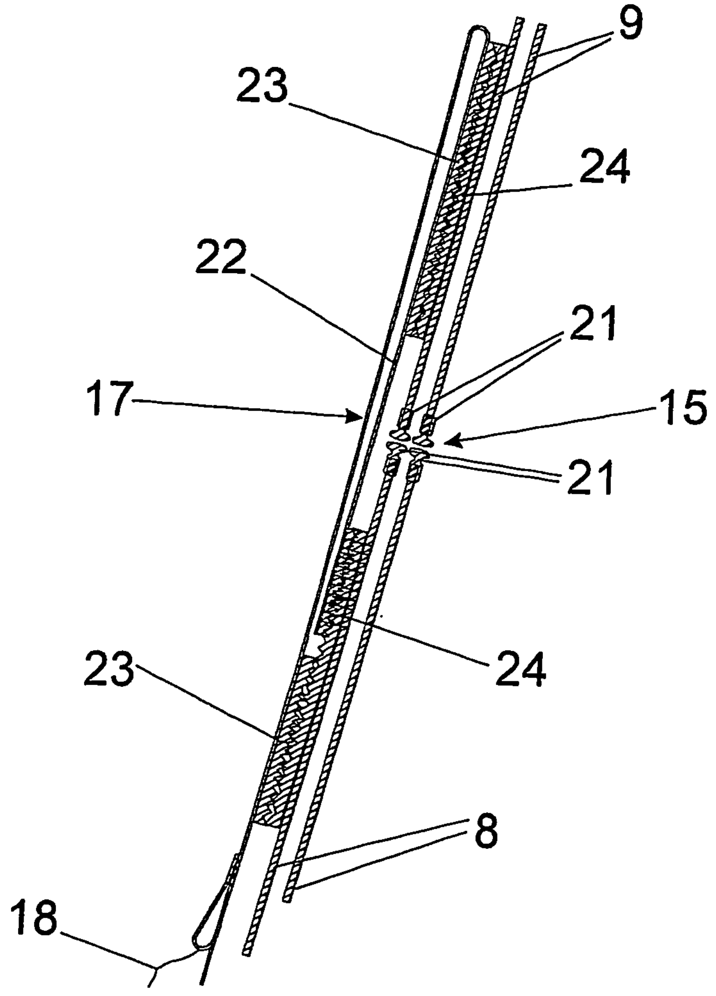
FIG. 4 shows the overlap region in section taken along line IV-IV in FIG. 3 with securing connection.

At the desired separation location 15 the two material webs 8 and 9 are connected by a zip fastener 16, which does not have any slider and which is opened in its two mutually overlapping end regions (FIG. 3 and FIG. 4). The zip fastener 16 does not withstand the positive air pressure in the hollow body 1, by virtue of its opened ends 21, and separation takes place in a few seconds, whereby the free end region 4 is blown off and the anchored part quickly collapses into itself by virtue of the large opening. Provided at the free end 3 is a catch line 19 so that the light-weight free end region which involves the material webs 9, 10, 11 and 12 can be pulled down to the ground.

The desired separation location 15 is secured by a connection 17 which is releasable by way of a rip cord 18 from the ground and which comprises a tongue 22 (FIG. 4) which covers over the overlapping ends 21 and which is fixed to the material web 8 and to the material web 9 by means of hook-and-loop fasteners 23, 24. If separation is to be effected at the desired separation location, a pull is applied to the rip cord 18 and the tongue 22 releases the ends 21 so that the zip fastener 16 can be opened as described.

At the anchorage end 2 the hollow body 1 is preferably of a diameter of 5 meters while at the free upper end 3 it is of a diameter of 75 centimeters. The blower preferably produces a positive pressure of about 5 to 35 mbars, which has proven to be advantageous for the dimensioning of the hollow body 1.

It will be appreciated that the invention is not restricted to the embodiments illustrated. By way of example the hollow bodies do not have to be implemented in the form of posts projecting from the ground. Rather, other configurations are also possible, for example arcuate configurations, in which the length of the hollow body is then the extent along the notional longitudinal centre line of the arc.

The invention claimed is:

1. A frustoconical hollow body (1), comprising:

an anchorable end (2) of the hollow body (1), a free end (3) of the hollow body (1), said hollow body (1) being composed of a plurality of flexible material webs (4 to 12), said material webs (4 to 12) being formed of strips arranged sequentially along an axial direction of the hollow body (1) from the anchorable end (2) to the free end (3), each of said material webs (4 to 12) extending in a peripheral direction of the hollow body (1), and bracing means that are guyed to a flexible material web in a region of said anchorable end (2) of the hollow body (1), and that anchor said anchorable end (2) to a base support (30), the bracing means being guyed to said region of said anchorable end (2) with the free end (3) being free of bracing means; wherein a region of the free end (3) of said hollow body (1) is stabilized exclusively by a continuous feed of air that maintains a positive air pressure inside said hollow body (1), and at least one of said material webs that is positioned in the region of the anchorable end (2) is formed of a first fabric that has a greater value in units of mass per unit of surface area than a value in units of mass per unit of surface area of a second fabric that forms at least one of said material webs that is positioned in the region of the free end (3), and said first fabric has a greater tearing strength than a tearing strength of said second fabric.

2. A hollow body according to claim 1, wherein adjacent material webs have at least in part different units of mass per unit of surface area.

3. A hollow body according to claim 1, wherein denser material webs (4, 5, 6, 7, 8) are at least partially comprised of a coated polyester fabric.

4. A hollow body according to claim 1, wherein less dense material webs (9, 10, 11, 12) are at least partially comprised of a rip stop fabric.

5. A hollow body according to claim 1, wherein each material web (4 to 12) is comprised of a fabric having warp threads extending in the peripheral direction of the hollow body (1), and having warp threads that are stretchable by the positive air pressure in the hollow body (1) by 5% to 6%.

6. A hollow body according to claim 1, wherein the units of mass per unit of surface area of the material webs (4 to 12) are between 50 and 700 grams per square meter.

7. A hollow body according to claim 1, wherein the units of mass per unit of surface area of the material webs (9, 10, 11, 12) that are positioned in the region of the free end (3) of the hollow body are less than 150 grams per square meter.

8. A hollow body according to claim 1, further comprising at least one separation location (15).

9. A hollow body according to claim 8, wherein the desired separation location (15) is positioned on the hollow body (1) approximately at a midpoint of a length of the hollow body (1).

10. A hollow body according to claim 8, wherein the material webs (9, 10, 11, 12) positioned between the separation location (15) and the free end (3) are comprised of a rip stop fabric.

11. A hollow body according to claim 1, further comprising a catch line (19) arranged at the free end (3) of the hollow body (1).

12. A hollow body according to claim 1, wherein the hollow body (1) is configured to be stabilized by the positive air pressure in the hollow body (1) at a pressure that is at least 10% of a real bursting pressure of the hollow body (1).

13. A hollow body according to claim 12, wherein the hollow body (1) is configured to be stabilized by the positive air pressure in the hollow body (1) at a pressure that is at least 50% of the real bursting pressure of the hollow body (1).

14. A hollow body according to claim 1, wherein the hollow body (1) is configured to be stabilized by the positive air pressure in the hollow body (1) at a pressure that is between 3% and 50% of a theoretical bursting pressure of material of which the hollow body (1) is comprised.

15. A hollow body according to claim 14, wherein the hollow body (1) is configured to be stabilized by the positive air pressure in the hollow body (1) at a pressure that is between 5% and 25% of the theoretical bursting pressure of the material of which the hollow body (1) is comprised.

16. A hollow body according to claim 1, wherein the hollow body (1) is configured to be stabilized by the positive air pressure in the hollow body (1) at a pressure that is between 5 and 35 mbars.

17. A hollow body according to claim 16, wherein the hollow body (1) is configured to be stabilized by the positive air pressure in the hollow body (1) is at a pressure that is between 10 and 15 mbars.

18. A frustoconical hollow body (1), comprising:

an anchorable end (2) of the hollow body (1), and a free end (3) of the hollow body (1), said hollow body (1) being comprised of a plurality of flexible material webs (4 to 12), each of said material webs (4 to 12) extending in a peripheral direction of the hollow body (1), wherein said hollow body (1) is stabilized by positive air pressure, said hollow body comprises at least one separation location (15), said anchorable end of said hollow body (1) is adapted to be anchored to a base support (30) by way of bracing means, units of mass per unit of surface area of the material webs (4 to 12) are greater in a region of the anchorable end (2) than in a region of the free end (3), and the separation location (15) comprises a remotely operable zip fastener (16).

19. A hollow body according to claim 18, wherein the zip fastener (16) comprises opened ends (21) held together by a removable connection (17).

20. A hollow body according to claim 19, wherein the removable connection (17) is a tongue (22), said tongue (22) bridging over the ends (21), with a hook-and-loop fastener (23, 24) which is provided with a rip cord (18).

21. A hollow body according to claim 19, wherein the separation location (15) is adapted to be opened by the positive air pressure stabilizing the hollow body (1) after removal of the connection (17) of the ends (21) of the zip fastener (16).

* * * * *